United States Patent
Park et al.

(10) Patent No.: US 10,101,633 B2
(45) Date of Patent: Oct. 16, 2018

(54) OPTICAL SWITCH

(71) Applicant: ELECTRONICS AND TELECOMMUNICATIONS RESEARCH INSTITUTE, Daejeon (KR)

(72) Inventors: Jaegyu Park, Daejeon (KR); Myungjoon Kwack, Gimpo (KR); Jiho Joo, Sejong (KR); Gyungock Kim, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/661,996

(22) Filed: Jul. 27, 2017

(65) Prior Publication Data

US 2018/0113371 A1   Apr. 26, 2018

(30) Foreign Application Priority Data

Oct. 26, 2016 (KR) .................. 10-2016-0140310
Mar. 9, 2017  (KR) .................. 10-2017-0030289

(51) Int. Cl.
  *G02B 6/14* (2006.01)
  *G02F 1/313* (2006.01)
(52) U.S. Cl.
  CPC .......... *G02F 1/3138* (2013.01); *G02F 1/3133* (2013.01); *G02F 1/3134* (2013.01); *G02F 2201/12* (2013.01)

(58) Field of Classification Search
  USPC ..................................................... 385/9, 14
  See application file for complete search history.

(56) References Cited

U.S. PATENT DOCUMENTS

| 5,224,185 A | 6/1993 | Ito et al. |
| 5,778,112 A | 7/1998 | Hwang et al. |
| 8,682,116 B2 * | 3/2014 | Schulz ............... H01L 31/0232 250/214.1 |
| 2003/0035612 A1 | 2/2003 | Lee et al. |
| 2013/0223793 A1 | 8/2013 | Kim et al. |

FOREIGN PATENT DOCUMENTS

| KR | 10-0153860 B1 | 10/1998 |
| WO | WO 2008/032023 A1 | 3/2008 |

OTHER PUBLICATIONS

Jong-Hun Kim et al., "Total internal reflection optical switch using the reverse breakdown of a pn junction in silicon", Optics Letters, Nov. 1, 2015, pp. 4859-4862, vol. 40, No. 21, Optical Society of America.

* cited by examiner

*Primary Examiner* — Eric Wong

(57) ABSTRACT

Provided is an optical switch including a substrate, a first optical waveguide disposed on the substrate and having a conductive portion disposed on one surface thereof, and a second optical waveguide disposed on the substrate being spaced apart from the first optical waveguide and having an electrode portion disposed on one surface thereof. The electrode portion and the conductive portion face each other. The electrode portion controls an optical field between the first optical waveguide and the second optical waveguide.

17 Claims, 15 Drawing Sheets

OPTICAL SWITCH

CROSS-REFERENCE TO RELATED APPLICATIONS

This U.S. non-provisional patent application claims priority under 35 U.S.C. § 119 of Korean Patent Application Nos. 10-2016-0140310, filed on Oct. 26, 2016, and 10-2017-0030289, filed on Mar. 9, 2017, the entire contents of which are hereby incorporated by reference.

BACKGROUND

The present disclosure relates to an optical switch, and more particularly to an optical switch including a plurality of optical waveguides.

With the development of technology, products used in the optical and semiconductor industries are becoming lower-priced, miniaturized, integrated, lower-powered, and ultra-fast. Accordance to the trend of such an industry, the integration of optical elements such as a light source, an optical detector, an optical modulator, or an optical switch based on a semiconductor or a dielectric waveguide structure into a single chip is actively researched and developed. In order to implement such a single chip integration, the performance of each optical element should be good and also its performance should be maintained even when integrated with other elements into a single chip.

The optical switch has an optical line switching function and is important as an optical communication exchanger. The method of using the optical waveguide and switching the overall path of light has the advantages of high reliability and high speed. A general polymer total reflection type optical switch is provided with a heater installed at a central portion of optical waveguides that intersect with each other. The polymer total reflection type optical switch heats a portion of an optical waveguide through a heater. In this case, it has a structure in which the refractive index of an optical waveguide material changes due to a temperature change of the optical waveguide, thereby generating a total reflection phenomenon.

SUMMARY

Embodiments of the present inventive provide an optical switch operating in high speed.

Embodiments of the present inventive also provide an optical switch having a small size.

According to exemplary embodiments, an optical switch may include a substrate; a first optical waveguide disposed on the substrate and having a conductive portion disposed on one surface thereof; and a second optical waveguide disposed on the substrate being spaced apart from the first optical waveguide and having an electrode portion disposed on one surface thereof. The electrode portion and the conductive portion face each other. The electrode portion controls an optical field between the first optical waveguide and the second optical waveguide.

In an embodiment, in a first operation mode, the electrode portion may densify charges in a portion of the conductive portion adjacent to the second optical waveguide to block an optical field between the first optical waveguide and the second optical waveguide, and in a second operation mode, may evenly distribute the charges densified in the portion of the conductive portion in the conductive portion to optically couple the optical field between the first optical waveguide and the second waveguide.

In an embodiment, the conductive portion and the first optical waveguide may include the same material, and the conductive portion may be doped with an impurity.

In an embodiment, the first optical waveguide and the conductive portion may be integrated.

In an embodiment, the conductive portion may include doped polysilicon or a transparent semiconductor.

In an embodiment, the electrode portion and the second optical waveguide may include the same material, and the electrode portion may be doped with an impurity.

In an embodiment, the second optical waveguide and the electrode portion may be integrated.

In an embodiment, the electrode portion may include a transparent electrode.

In an embodiment, the optical switch may further include a transparent insulation film disposed between the electrode portion and the conductive portion.

In an embodiment, the optical switch may further include a dielectric layer disposed between the first optical waveguide and the conductive portion or between the second optical waveguide and the electrode portion.

According to exemplary embodiments, an optical switch may include a substrate; an optical waveguide disposed on the substrate and including a first optical waveguide and a second optical waveguide intersecting each other; a conductive portion disposed on an intersection region of the first optical waveguide and the second optical waveguide; an electrode portion disposed on the conductive portion; and a transparent insulation film disposed between the electrode portion and the conductive portion. The electrode portion crosses the intersection region of the first optical waveguide and the second optical waveguide. The electrode portion controls a path of light traveling the first optical waveguide and the second optical waveguide.

In an embodiment, in a first operation mode, the electrode portion may densify charges in a portion of the conductive portion adjacent to the electrode portion to totally reflect light traveling the first optical waveguide into the second optical waveguide, and in a second operation mode, may evenly distribute the charges densified in the portion of the conductive portion in the conductive portion to transmit the light traveling the first optical waveguide.

In an embodiment, a first angle between the electrode portion and the first optical waveguide may be identical to a second angle between the electrode portion and the second optical waveguide.

In an embodiment, the conductive portion may include the same material as the optical waveguide and the conductive portion may be doped with an impurity.

In an embodiment, the conductive portion and the optical waveguide may be integrated.

In an embodiment, the conductive portion may include doped polysilicon, a transparent semiconductor, or a transparent electrode In an embodiment, the optical switch may further include a first auxiliary electrode portion and a second auxiliary electrode portion on the conductive portion. The first auxiliary electrode portion and the second auxiliary electrode portion may be disposed on both sides of the first optical waveguide adjacent to the intersection region of the first optical waveguide and the second optical waveguide.

In an embodiment, the optical switch may further include a third auxiliary electrode portion disposed on one side of a center portion of the electrode portion. The third auxiliary electrode portion may be electrically connected to the conductive portion and the third auxiliary electrode portion may be electrically insulated from the electrode portion.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
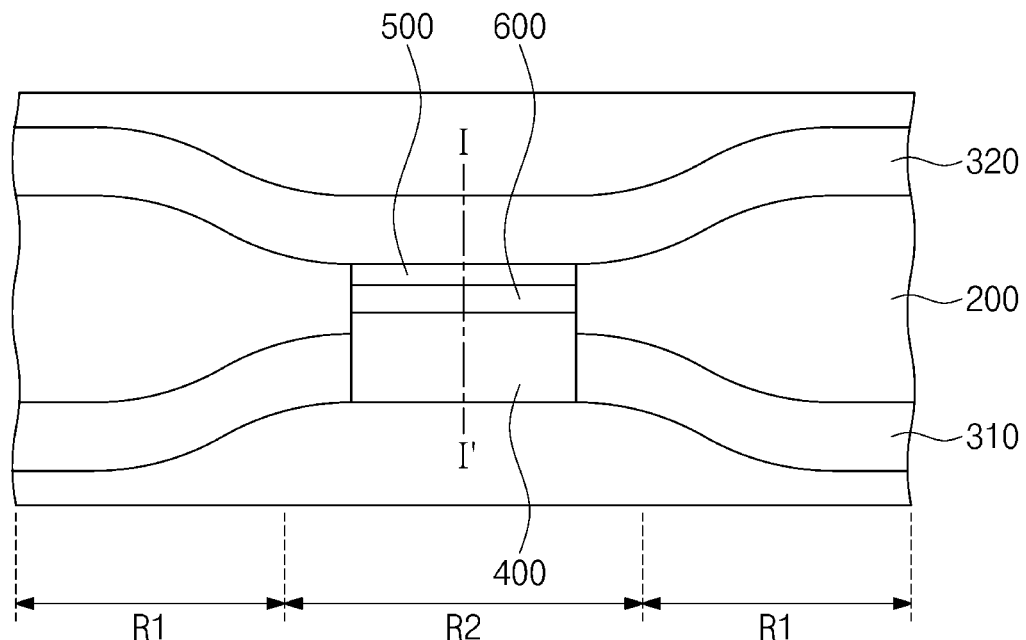
FIG. 1A is a plan view illustrating an optical switch according to embodiments of the inventive concept.

In order to fully understand the configuration and effects of the technical spirit of the inventive concept, preferred embodiments of the technical spirit of the inventive concept will be described with reference to the accompanying drawings. However, the technical spirit of the inventive concept is not limited to the embodiments set forth herein and may be implemented in various forms and various modifications may be applied thereto. Only, the technical spirit of the inventive concept is disclosed to the full through the description of the embodiments, and it is provided to those skilled in the art that the inventive concept belongs to inform the scope of the inventive concept completely. Those of ordinary skill in the art will understand that the concepts of the inventive concept may be practiced in any suitable environment.

The terms used in this specification are used only for explaining specific embodiments while not limiting the inventive concept. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

In this specification, when a film (or layer) is referred to as being on another film (or layer) or substrate, it may be directly on the other film (or layer) or substrate, or a third film (or layer) may be interposed.

It will be understood that the terms "first", "second", and "third" are used herein to describe various regions, films (or layers), and so on, but these regions, films (or layers), and so on should not be limited by these terms. These terms are only used to distinguish any predetermined region or film (or layer) from another region or film (or layer). Thus, a membrane referred to as a first membrane in one embodiment may be referred to as a second membrane in another embodiment. Embodiments described herein include complementary embodiments thereof. Like reference numerals refer to like elements throughout the specification.

Unless otherwise the terms used in embodiments of the inventive concept are defined differently, they may be interpreted as commonly known to those skilled in the art.

Hereinafter, an optical switch according to the concept of the inventive concept will be described with reference to the drawings.

Figure 1B:
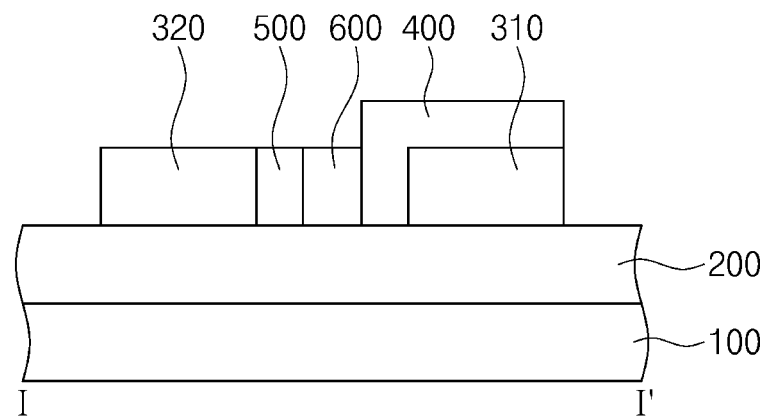
FIG. 1B is a sectional view taken along a line I-I' of FIG. 1A.

FIG. 1A is a plan view illustrating an optical switch according to embodiments of the inventive concept. FIG. 1B is a sectional view taken along a line I-I' of FIG. 1A.

Referring to FIGS. 1A and 1B, a substrate 100 may be provided. The substrate 100 may have a first region R1 and a second region R2. The first region R1 may be disposed between a plurality of second regions R2. A buffer layer 200 may be disposed on the substrate 100. The buffer layer 200 may include silicon oxide ($SiO_2$).

A first optical waveguide 310 and a second optical waveguide 320 may be disposed on the buffer layer 200. The first optical waveguide 310 and the second optical waveguide 320 may be horizontally spaced apart from each other. The first optical waveguide 310 and the second optical waveguide 320 may have a shape in which they are more adjacent to each other on the second region R2 of the substrate 100 than the first region R1. An interval between the first optical waveguide 310 and the second optical waveguide 320 may be closer on the second region R2 than the first region R1 of the substrate 100. The second region R2 of the substrate 100 may be a region where light is switched in the first optical waveguide 310 and the second optical waveguide 320. The first optical waveguide 310 and the second optical waveguide 320 may include polysilicon (poly Si), silicon oxide ($SiO_2$), or silicon nitride ($Si_3N_4$).

The first optical waveguide 310 may have a conductive portion 400. The conductive portion 400 may be disposed on one side of the first optical waveguide 310 on the second region R2 of the substrate 100. For example, the conductive portion 400 may be disposed on a side surface of the first optical waveguide 310 facing the second optical waveguide 320. According to embodiments, the conductive portion 400 may extend on the upper surface of the first optical waveguide 310. In this case, the amount of charge in the conductive portion 400 may increase. The conductive portion 400 may include a transparent electrode, an oxide semiconductor, single crystal silicon, or polysilicon (poly Si). At this time, an oxide semiconductor, single crystal silicon, or polysilicon (poly Si) may be doped. The conductive portion 400 may be doped to have a charge density of $10^{18}/cm^3$ or less.

Although not shown in the drawing, a first dielectric layer (not shown) may be further disposed between the first optical waveguide 310 and the conductive portion 400. The first dielectric layer (not shown) may be provided between the first optical waveguide 310 and the conductive portion 400. The refractive index of the first dielectric layer (not shown) may be less than or equal to the refractive index of the first optical waveguide 310. For example, the first dielectric layer (not shown) may include silicon oxide (SiO$_2$).

The second optical waveguide 320 may have an electrode portion 500. The electrode portion 500 may be disposed on one side of the second optical waveguide 320 on the second region R2 of the substrate 100. The electrode portion 500 may face the conductive portion 400. For example, the electrode portion 500 may be disposed on the side of the second optical waveguide 320 facing the first optical waveguide 310. The electrode portion 500 may include a transparent electrode, an oxide semiconductor, or polysilicon (poly Si). At this time, an oxide semiconductor or polysilicon (poly Si) may be doped.

Although not shown in the drawing, a second dielectric layer (not shown) may be further disposed between the second optical waveguide 320 and the electrode portion 500. The second dielectric layer (not shown) may be provided between the second optical waveguide 320 and the electrode portion 500. The refractive index of the second dielectric layer (not shown) may be less than or equal to the refractive index of the second optical waveguide 320. For example, the second dielectric layer (not shown) may include silicon oxide (SiO$_2$).

A transparent insulation film 600 may be disposed between the conductive portion 400 and the electrode portion 500. The transparent insulation film 600 may electrically isolate the conductive portion 400 and the electrode portion 500. The transparent insulation film 600 may include silicon oxide (SiO$_2$). According to embodiments of the inventive concept, the transparent insulation film 600 may not be provided.

Although it is described with reference to FIGS. 1A and 1B that each of the first optical waveguide 310 and the second optical waveguide 320 have the separate conductive portion 400 and the separate electrode portion 500, the inventive concept is limited thereto. FIGS. 2A to 4A are plan views illustrating an optical switch according to embodiments of the inventive concept. FIGS. 2B to 4B are sectional views taken along lines I-I' of FIGS. 2A to 4A.

Figure 2A:
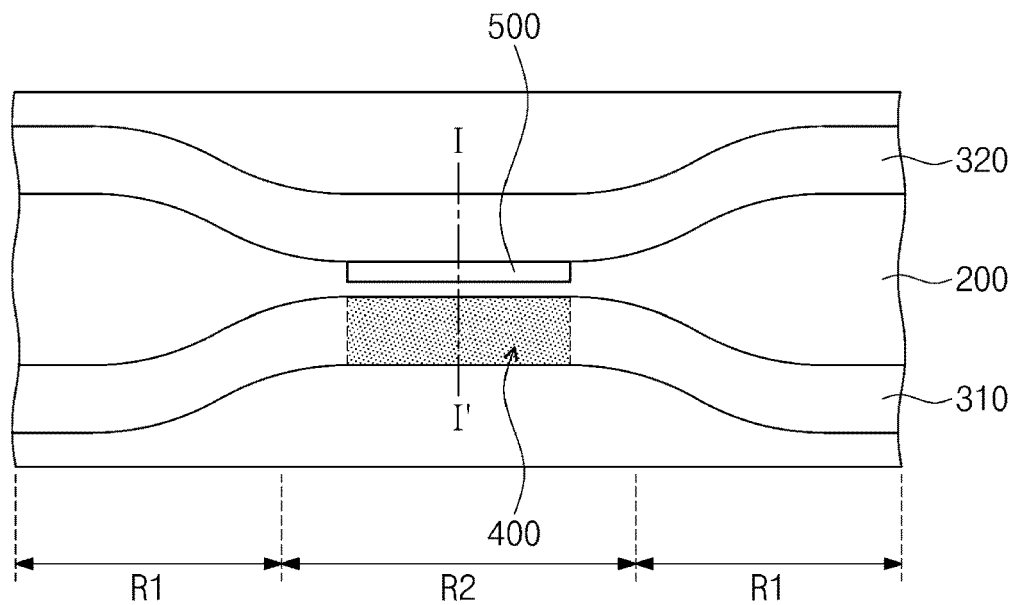
FIGS. 2A, 3A and 4A are plan views illustrating an optical switch according to embodiments of the inventive concept.
Figure 2B:
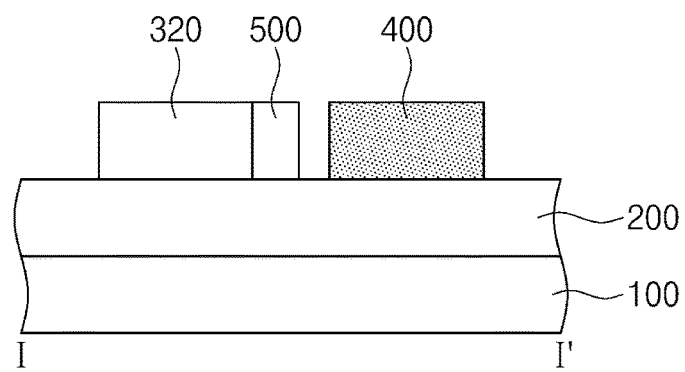
FIGS. 2B, 3B and 4B are sectional views taken along lines I-I' of FIGS. 2A to 4A.

As shown in FIGS. 2A and 2B, the conductive portion 400 may be integrated with the first optical waveguide 310. For example, the conductive portion 400 may be a doped portion of the first optical waveguide 310 on the second region R2 of the substrate 100. The conductive portion 400 may include the same material as the first optical waveguide 310. For example, the first optical waveguide 310 and the conductive portion 400 may include polysilicon (poly Si). At this time, the conductive portion 400 may be doped with an impurity so as to have a p-type or n-type conductivity type. In one embodiment, the conductive portion 400 may have a tapered interface. For example, from the plan viewpoint, the conductive portion 400 may have a shape whose width gradually decreases at one end thereof.

Figure 3A:
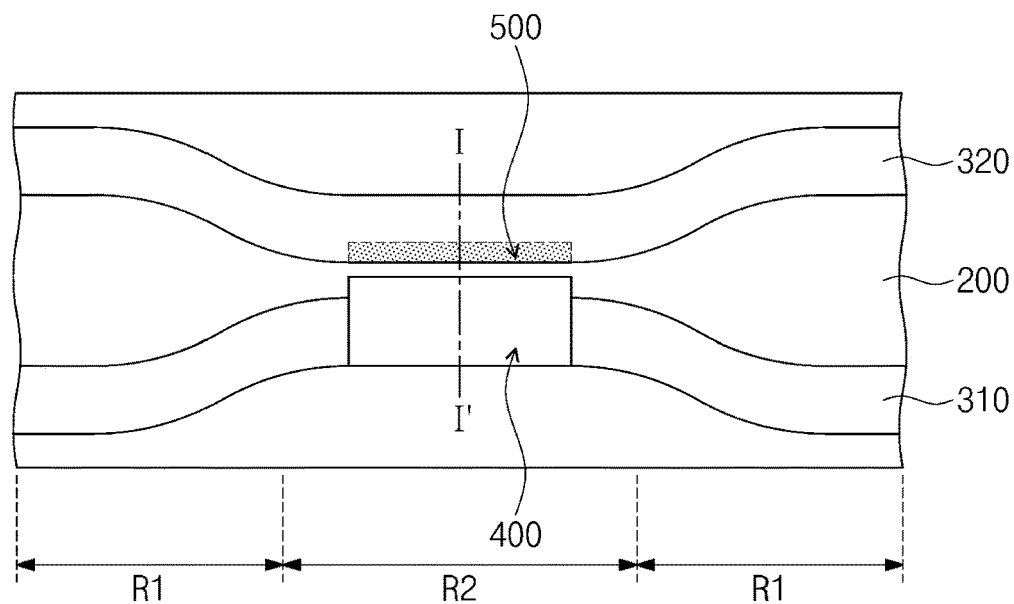
Figure 3B:
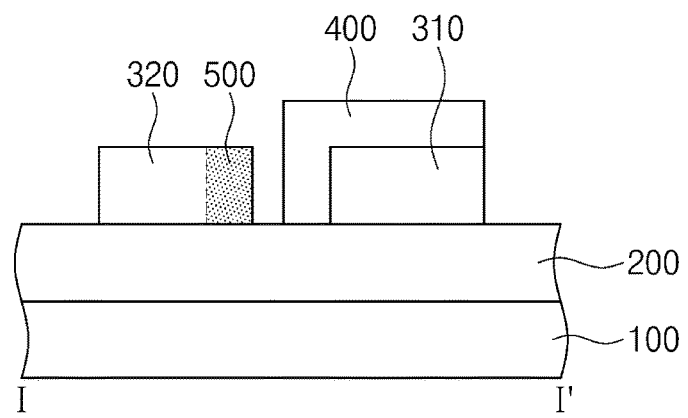

Alternatively, as shown in FIGS. 3A and 3B, the electrode portion 500 may be integrated with the second optical waveguide 320. For example, the electrode portion 500 may be a doped portion of the second optical waveguide 320 on the second region R2 of the substrate 100. The electrode portion 500 may include the same material as the second optical waveguide 320. For example, the second optical waveguide 320 and the electrode portion 500 may include polysilicon (poly Si). At this time, the electrode portion 500 may be doped with an impurity so as to have a p-type or n-type conductivity type.

Figure 4A:
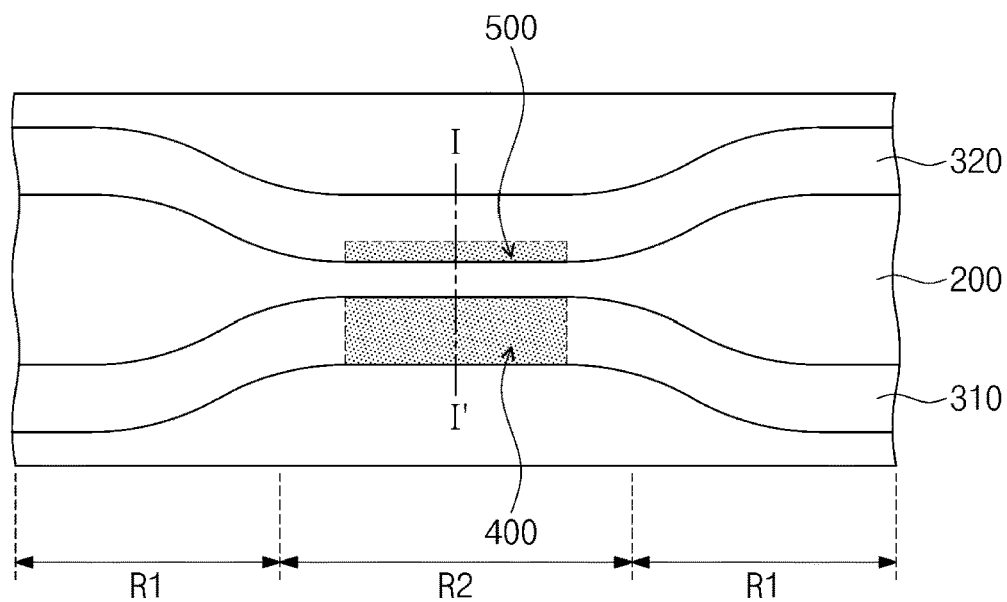
Figure 4B:
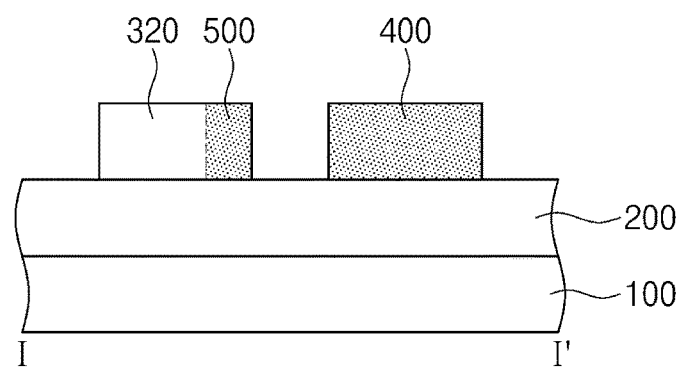

Unlike this, as shown in FIGS. 4A and 4B, the conductive portion 400 and the electrode portion 500 may be integrated with the first optical waveguide 310 and the second optical waveguide 320, respectively. For example, the conductive portion 400 is a doped portion of the first optical waveguide 310 on the second region R2 of the substrate 100 and the electrode portion 500 is a doped portion of the second optical waveguide 320 on the second region R2 of the substrate 100. The conductive portion 400 and the electrode portion 500 may include the same material as the first optical waveguide 310 and the second optical waveguide 320, respectively. For example, the first optical waveguide 310, the second optical waveguide 320, the conductive portion 400, and the electrode portion 500 may include polysilicon (poly Si). At this time, the conductive portion 400 and the electrode portion 500 may be doped with an impurity so as to have a p-type or n-type conductivity type.

Figure 5A:
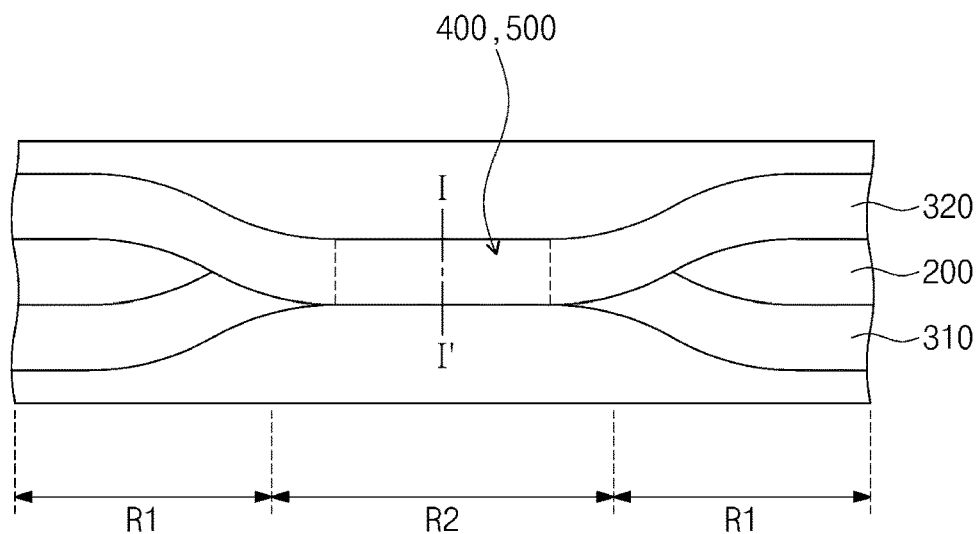
FIG. 5A is a plan view illustrating an optical switch according to embodiments of the inventive concept.
Figure 5B:
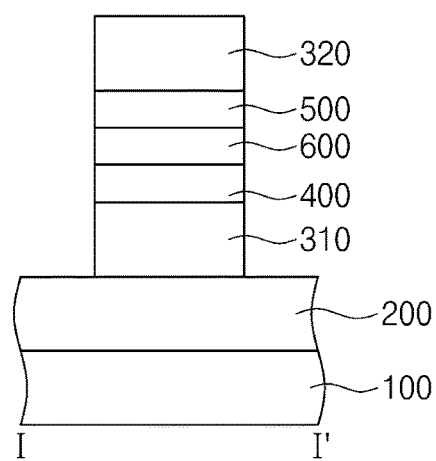
FIG. 5B is a sectional view taken along a line I-I' of FIG. 5A.

According to other embodiments, the first optical waveguide 310 and the second optical waveguide 320 may be vertically spaced. FIG. 5A is a plan view illustrating an optical switch according to embodiments of the inventive concept. FIG. 5B is a sectional view taken along a line I-I' of FIG. 5A.

As shown in FIGS. 5A and 5B, the second optical waveguide 320 may be disposed on the first optical waveguide 310. At this time, the first optical waveguide 310 and the second optical waveguide 320 may overlap in a planar manner on the second region R2 of the substrate 100. For example, the conductive portion 400, the transparent insulation film 600, the electrode portion 500, and the second optical waveguide 320 may be stacked on the first optical waveguide 310.

An electrode portion of an optical switch according to embodiments of the inventive concept controls an optical field between a first optical waveguide and a second optical waveguide in order to change the optical path of light that travels the first optical waveguide or the second optical waveguide. Hereinafter, an operation of an optical switch according to embodiments of the inventive concept will be described.

Figure 6A:
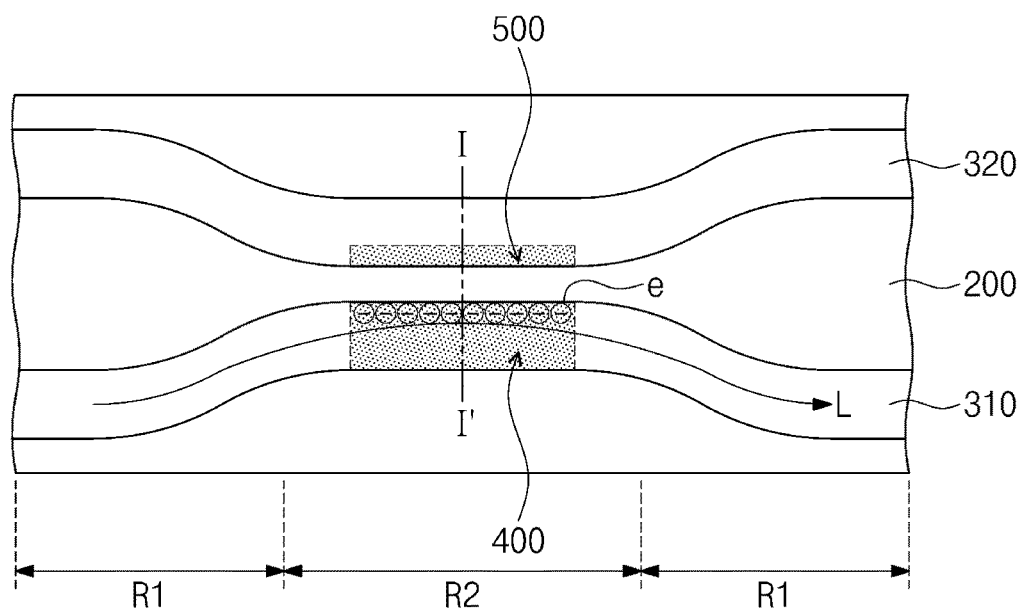
FIGS. 6A and 7A are plan views illustrating a switching operation of an optical switch according to embodiments of the inventive concept.
Figure 6B:
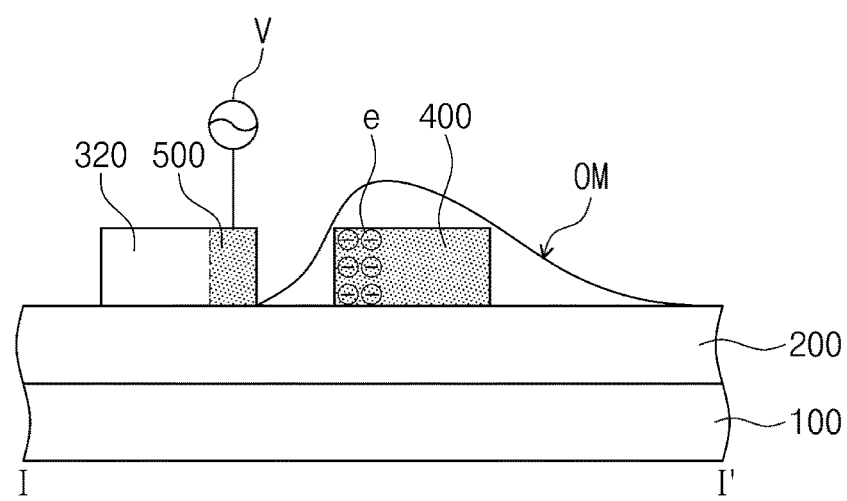
FIGS. 6B and 7B are sectional views taken along lines I-I' of FIGS. 6A to 7A.
Figure 7A:
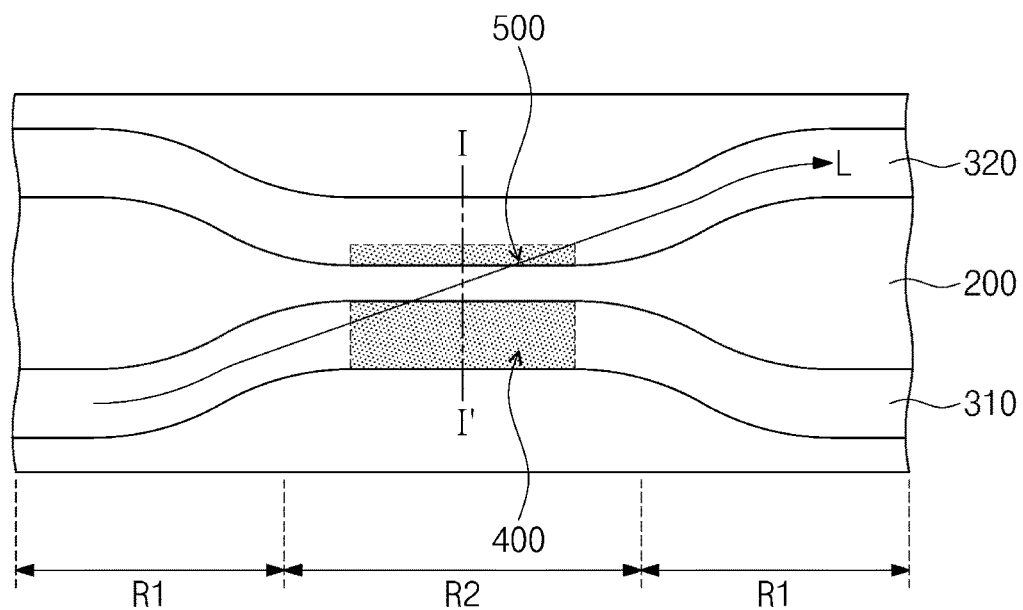
Figure 7B:
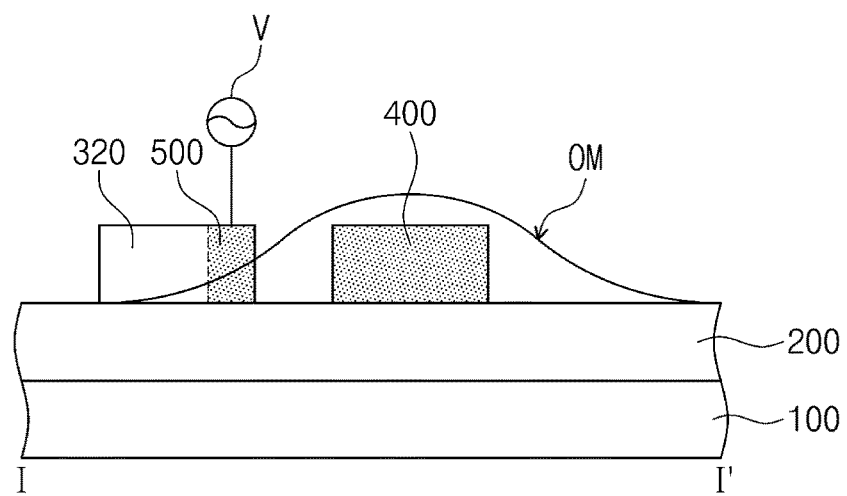

FIGS. 6A and 7A are plan views illustrating a switching operation of an optical switch according to embodiments of the inventive concept. FIGS. 6B and 7B are cross-sectional views taken along lines I-I' of FIGS. 6A and 7A, and show the optical mode (OM) distribution of a first optical waveguide.

Referring to FIGS. 6A and 6B, the optical switch may block the optical field between the first optical waveguide 310 and the second optical waveguide 320 in a first operation mode. For example, the electrode portion 500 may temporarily densify charges e to a portion of the conductive portion 400 adjacent to the second optical waveguide 320. The external power supply V may be applied to the electrode portion 500. The charges e in the conductive portion 400 may be densely packed into a portion of the conductive portion 400 adjacent to the second optical waveguide 320 by the electrode portion 500. The densified charges e may serve as a barrier for blocking the optical field between the first optical waveguide 310 and the second optical waveguide 320. Accordingly, the optical mode OM of the first optical waveguide 310 may be trapped near the first photoconductive portion 400, as shown in FIG. 6B. The first optical waveguide 310 and the second optical waveguide 320 may not be optically coupled. That is, the light L traveling the first optical waveguide 310 may not be switched to the second optical waveguide 320. In one embodiment, the blocking of the optical field may be improved depending on the charge density of the conductive portion 400. For example, the conductive portion 400 may be doped to have a charge density of $10^{18}/cm^3$ or less. When an external power V is applied to the electrode portion 500, charges are densified in a portion of the conductive portion 400 and the portion may have a charge density of $10^{18}/cm^3$ more. A portion of the conductive portion 400 having a charge density of $10^{18}/cm^3$ or more may change to a large value with a refractive index of 0.1 or more. Through this, the light L traveling the first optical waveguide 310 may be totally reflected into the first optical waveguide 310 without being switched to the second optical waveguide 320. That is, the blocking of the optical field between the first optical waveguide 310 and the second optical waveguide 320 may be improved.

As in the embodiment of FIG. 1A, when the optical switch has the conductive portion 400 extending on the upper surface of the first optical waveguide 310, the conductive portion 400 may have a larger amount of charges. Accordingly, the amount of densified charges may be large, and the optical field between the first optical waveguide 310 and the second optical waveguide 320 may be easily cut off.

Referring to FIGS. 7A and 7B, in the second operation mode, the first optical waveguide 310 and the second optical waveguide 320 may be optically coupled. In detail, the external power supply V may be removed from the electrode portion 500. The charges e densified in the conductive portion 400 may be evenly distributed in the conductive portion 400. That is, a barrier for blocking the optical field between the first optical waveguide 310 and the second optical waveguide 320 may be removed. The first optical waveguide 310 and the second optical waveguide 320 may be optically coupled as an evanescent wave coupling occurs between the respective original optical modes. Accordingly, the optical mode OM of the first optical waveguide 310 may have a symmetrical Gaussian shape extending to the second optical waveguide 320 as shown in FIG. 7B. Accordingly, the light L traveling the first optical waveguide 310 may be switched to the second optical waveguide 320. In one embodiment, the optical coupling may be improved depending on the charge density of the conductive portion 400. For example, the conductive portion 400 may be doped to have a charge density of $10^{18}/cm^3$ or less. At this time, if the charge density of the conductive portion 400 increases to $10^{18}/cm^3$ or more, light absorption may increase due to free carrier absorption. When the conductive portion 400 has a charge density of $10^{18}/cm^3$ or less, the light absorption by free carrier absorption of the conductive portion 400 may be less than 5% per 100 micrometers. That is, light absorption by free carrier absorption may be minimized.

Since an optical switch according to embodiments of the inventive concept performs an optical switching operation based on whether an external voltage is applied, the response speed of the optical switching operation may be very fast. In addition, the optical switch may not require a separate component for forming the optical switch. Accordingly, the size of an element including the optical switch may be reduced.

FIGS. 8A to 10A are plan views illustrating an optical switch according to embodiments of the inventive concept. FIGS. 8B to 10B are sectional views taken along lines II-IF of FIGS. 8A to 10A.

Figure 8A:
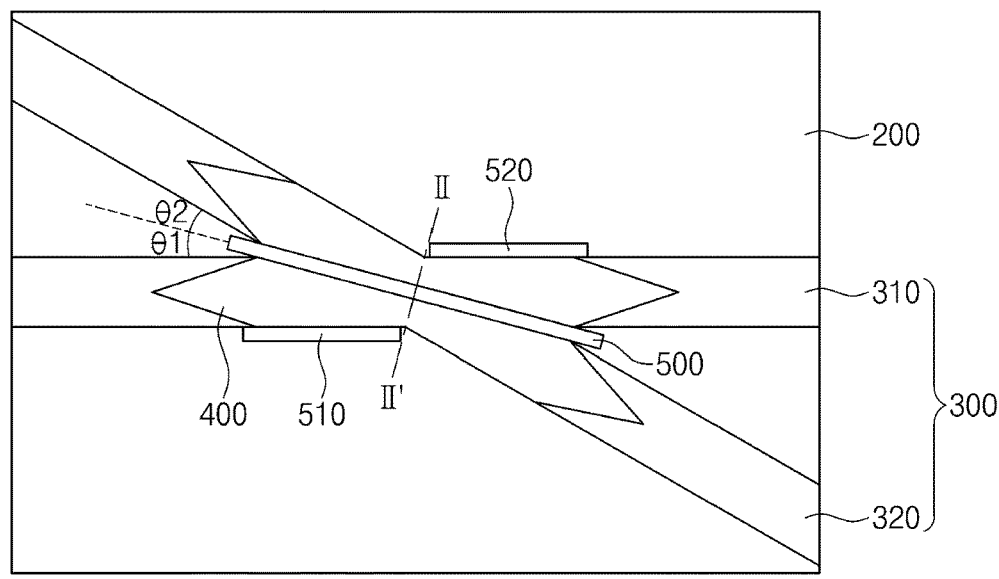
FIGS. 8A, 9A and 10A are plan views illustrating an optical switch according to embodiments of the inventive concept.
Figure 8A:
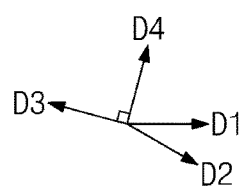
Figure 8B:
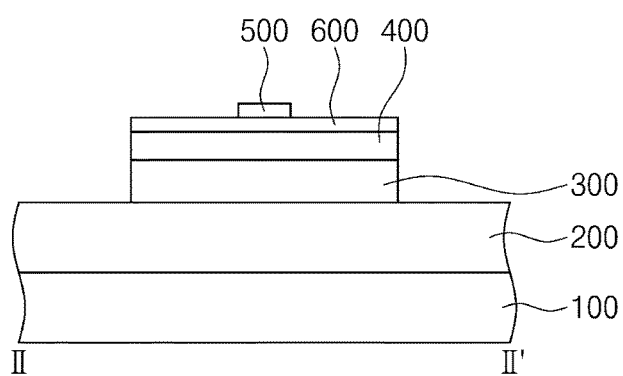
FIGS. 8B, 9B and 10B are sectional views taken along lines II-IF of FIGS. 8A to 10A.

Referring to FIGS. 8A and 8B, a substrate 100 may be provided. A buffer layer 200 may be disposed on the substrate 100.

An optical waveguide 300 may be disposed on the buffer layer 200. The optical waveguide 300 may include a first optical waveguide 310 and a second optical waveguide 320. The first optical waveguide 310 may have a line shape extending in a first direction D1. The second optical waveguide 320 may have a line shape extending in a second direction D2 intersecting the first direction D1. The first optical waveguide 310 and the second optical waveguide 320 may cross each other. The intersection region of the first optical waveguide 310 and the second optical waveguide 320 may be a region where light is switched in the first optical waveguide 310 and the second optical waveguide 320. The first optical waveguide 310 and the second optical waveguide 320 may include polysilicon (poly Si), silicon oxide ($SiO_2$), or silicon nitride ($Si_3N_4$).

A conductive portion 400 may be disposed on the first optical waveguide 310 and the second optical waveguide 320. For example, the conductive portion 400 may overlap with a portion of the first optical waveguide 310 and a portion of the second optical waveguide 320 in a planar manner. For example, the conductive portion 400 may be disposed on the intersection region of the first optical waveguide 310 and the second optical waveguide 320. The conductive portion 400 may include a transparent electrode, an oxide semiconductor, single crystal silicon, or polysilicon (poly Si). At this time, an oxide semiconductor, single crystal silicon, or polysilicon (poly Si) may be doped.

Although not shown in the drawing, a dielectric layer (not shown) may be further disposed between the first optical waveguide 310 and the conductive portion 400. The dielectric layer (not shown) may separate the first optical waveguide 310 from the conductive portion 400. The refractive index of the dielectric layer (not shown) may be less than or equal to the refractive index of the first optical waveguide 310. For example, the dielectric layer (not shown) may include silicon oxide ($SiO_2$).

The electrode portion 500 may be disposed on the conductive portion 400. The electrode portion 500 may have a bar shape extending in a third direction D3. From the plan viewpoint, the electrode portion 500 may cross the intersection regions of the first optical waveguide 310 and the second optical waveguide 320. At this time, a first angle θ1 between the first optical waveguide 310 and the electrode portion 500 may be the same as a second angle θ2 between the second optical waveguide 320 and the electrode portion 500. The electrode portion 500 may include an oxide semiconductor, single crystal silicon, or polysilicon (poly Si). At this time, an oxide semiconductor, single crystal silicon, or polysilicon (poly Si) may be doped.

Figure 9A:
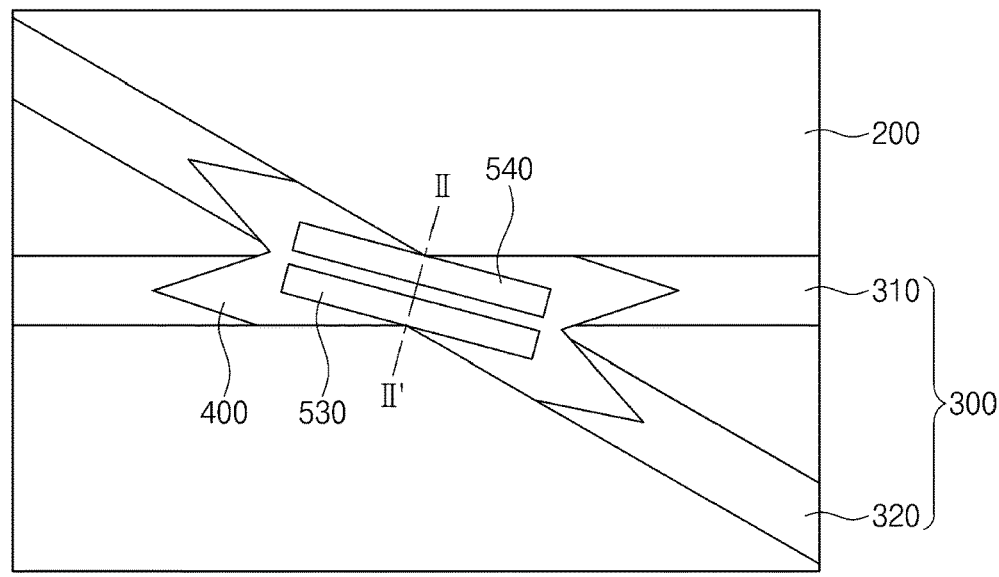
Figure 9A:
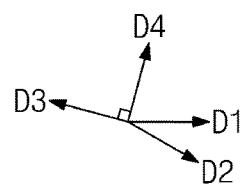
Figure 9B:
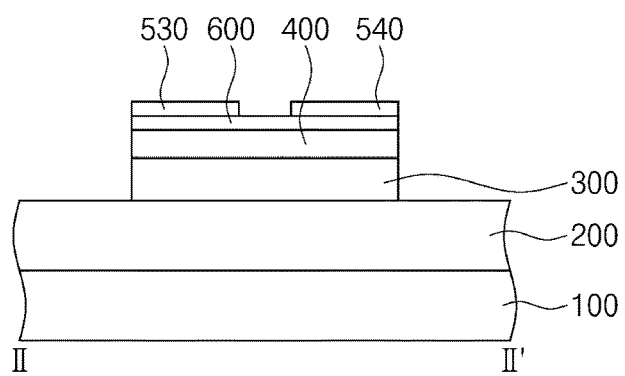

As shown in FIGS. 9A and 9B, the electrode portion 500 may include a first electrode portion 530 and a second electrode portion 540. The first electrode portion 530 and the second electrode portion 540 may have a bar shape extending in the third direction D3 and may be spaced apart in a fourth direction D4 perpendicular to the third direction D3. Hereinafter, for convenience of description, although description will be made on the basis of the embodiment of FIG. 8A, a structure of an optical switch described later may also be applied to the embodiment of FIG. 9A.

A transparent insulation film 600 may be disposed between the conductive portion 400 and the electrode portion 500. The transparent insulation film 600 may electrically isolate the conductive portion 400 and the electrode portion 500. The transparent insulation film 600 may include silicon oxide ($SiO_2$).

A first auxiliary electrode portion 510 and a second auxiliary electrode portion 520 may be disposed on the conductive portion 400. From the plan viewpoint, the first auxiliary electrode portion 510 and the second auxiliary electrode portion 520 may be disposed on both sides of the first optical waveguide 310. The first auxiliary electrode portion 510 and the second auxiliary electrode portion 520 may be disposed adjacent to the intersection region of the first optical waveguide 310 and the second optical waveguide 320. The first auxiliary electrode portion 510 and the second auxiliary electrode portion 520 may face each other with the second optical waveguide 320 therebetween. The first auxiliary electrode portion 510 and the second auxiliary electrode portion 520 may have bar shapes extending in the first direction D1. The first auxiliary electrode portion 510 and the second auxiliary electrode portion 520 may be a guide for preventing light from being lost to the outside of the optical waveguide 500. For example, when being totally reflected and transmitted in the intersection region of the first optical waveguide 310 and the second optical waveguide 320, light may be scattered. The first auxiliary electrode portion 510 and the second auxiliary electrode portion 520 may receive power from the outside to block the optical field. Accordingly, the light may not be lost to the outside. The first auxiliary electrode portion 510 and the second auxiliary electrode portion 520 may be omitted.

Figure 10A:
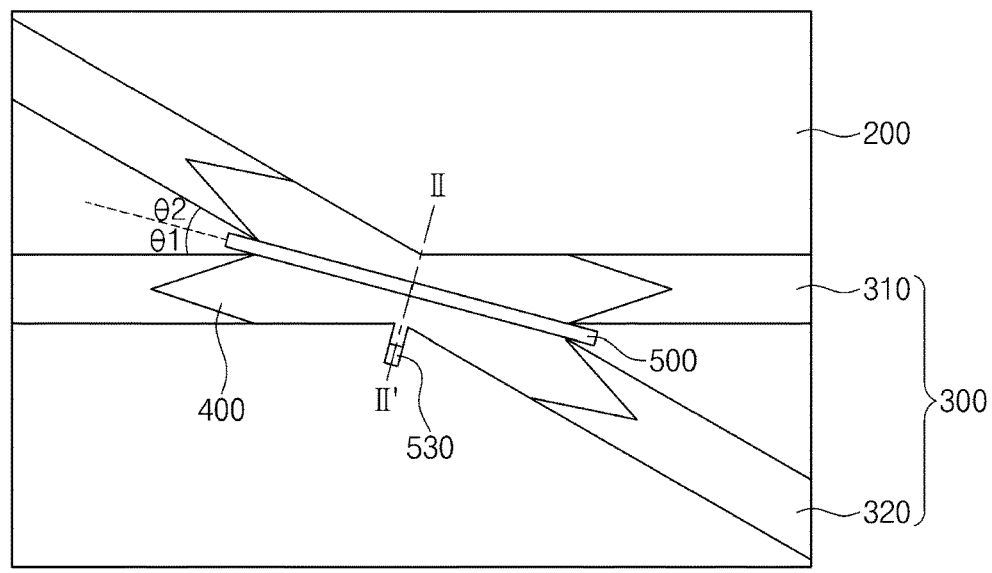
Figure 10A:
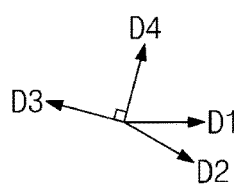
Figure 10B:
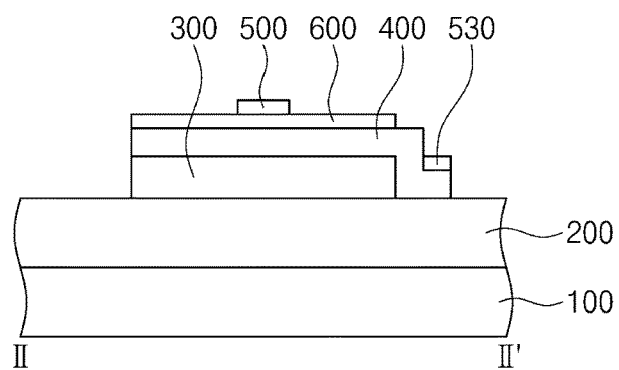
Figure 10B:

According to another embodiment, the electrode portion 500 may include a third auxiliary electrode portion 530. At this time, the first auxiliary electrode portion 510 and the second auxiliary electrode portion 520 may not be provided. As shown in FIGS. 10A and 10B, from the plan viewpoint, the third auxiliary electrode portion 530 may be disposed on one side of the electrode portion 500 from the center of the electrode portion 500. The third auxiliary electrode portion 530 may be linear extending in a direction intersecting the electrode portion 500. The third auxiliary electrode portion 530 may be electrically insulated from the electrode portion 500. For example, the third auxiliary electrode portion 530 may be spaced apart from the electrode portion 500. The third auxiliary electrode portion 530 may be electrically insulated from the electrode portion 400. For example, the conductive portion 400 may protrude toward one side of the transparent insulation film 600 and extend onto the buffer layer 200. The third auxiliary electrode portion 530 may be disposed on a portion of the conductive portion 400 protruding toward one side of the transparent insulation film 600. The third auxiliary electrode portion 530, as the counter electrode of the electrode portion 500, may improve the efficiency of the electrode portion 500 on the intersection region of the first optical waveguide 310 and the second optical waveguide 320.

According to embodiments of the inventive concept, a conductive portion may be integrated with an optical waveguide. FIGS. 11A to 13A are plan views illustrating an optical switch according to embodiments of the inventive concept. FIGS. 11B to 13B are sectional views taken along lines II-IF of FIGS. 11A to 13A.

Figure 11A:
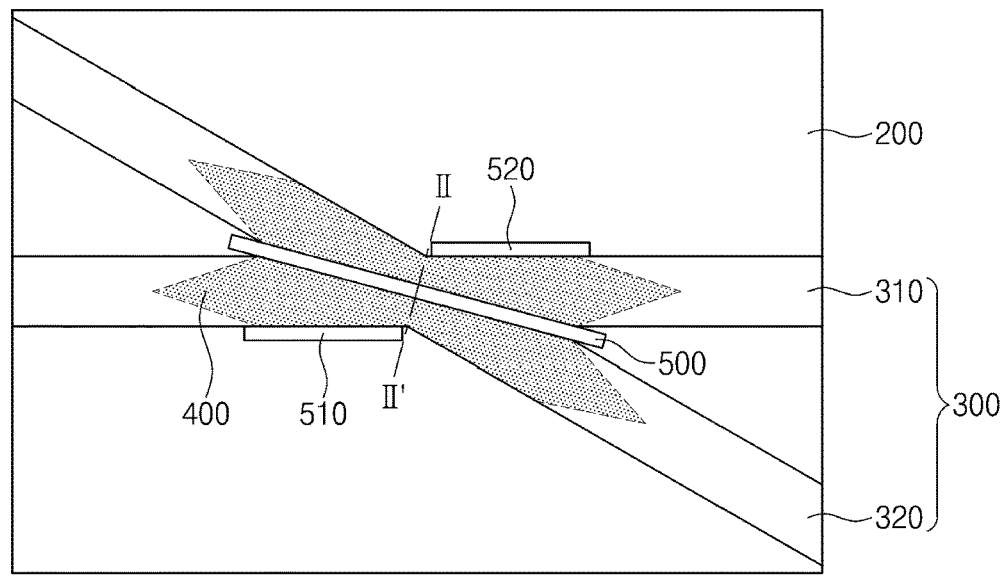
FIGS. 11A, 12A and 13A are plan views illustrating an optical switch according to embodiments of the inventive concept.
Figure 11A:
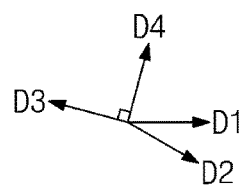
Figure 11B:
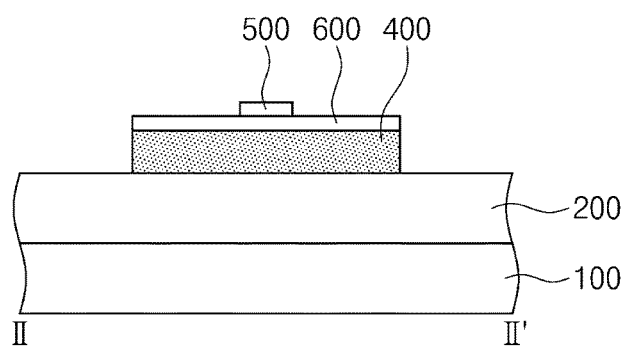
FIGS. 11B, 12B and 13B are sectional views taken along lines II-IF of FIGS. 11A to 13A.
Figure 12A:
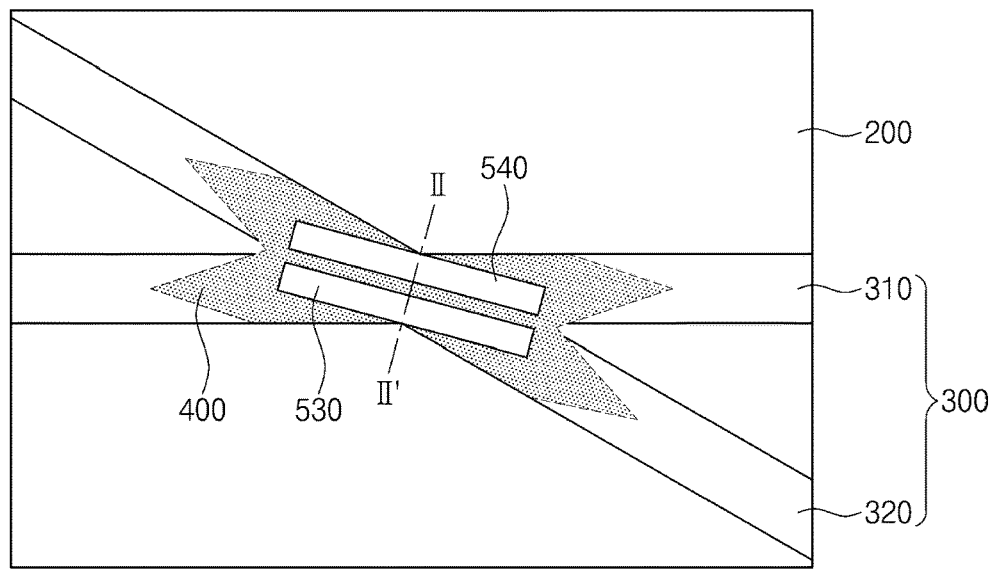
Figure 12B:
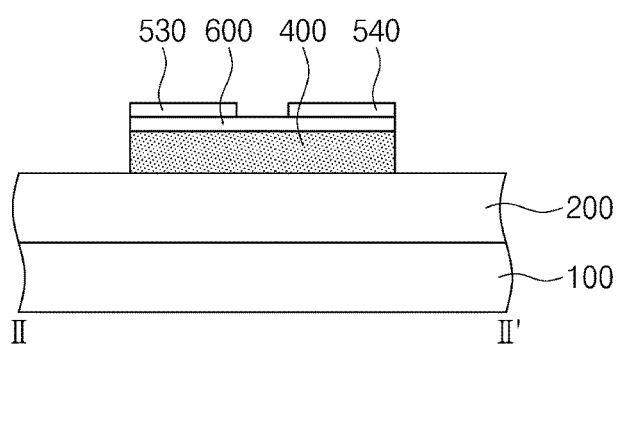
Figure 13A:
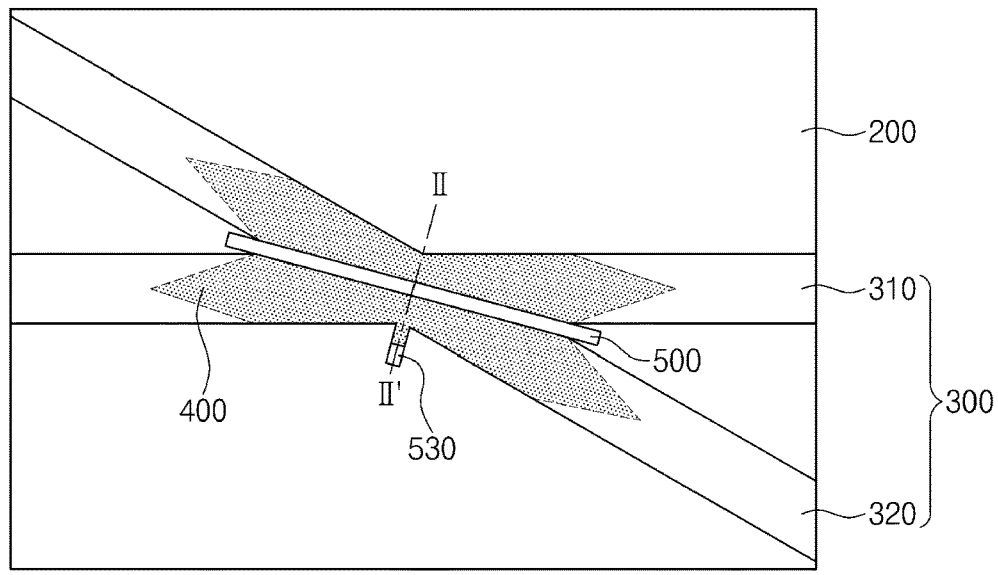
Figure 13A:
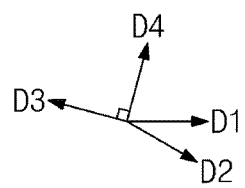
Figure 13B:
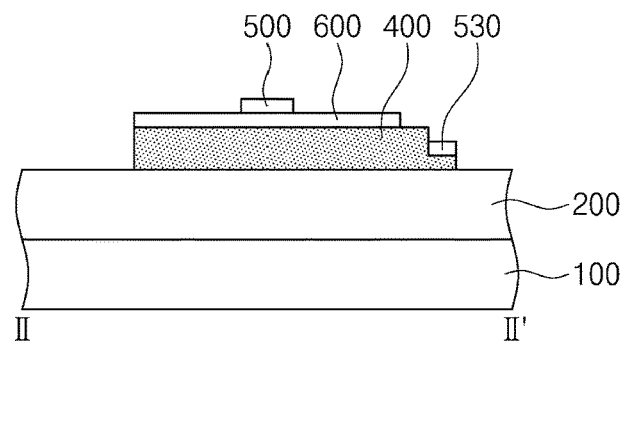

As shown in FIGS. 11A and 11B, a conductive portion 400 may be integrated with an optical waveguide 300. For example, in an intersection region of the first optical waveguide 310 and the second optical waveguide 320, the conductive portion 400 may be a doped portion of the optical waveguide 300. The conductive portion 400 may include the same material as the optical waveguide 300. For example, the conductive portion 400 and the optical waveguide 300 may include polysilicon (poly Si). At this time, the conductive portion 400 may be doped with an impurity so as to have a p-type or n-type conductivity type. According to embodiments, as shown in FIGS. 12A and 12B, the electrode portion 500 may include a first electrode portion 530 and a second electrode portion 540. Alternatively, according to other embodiments, as shown in FIGS. 13A and 13B, the electrode portion 500 may include a third auxiliary electrode portion 530. At this time, the first auxiliary electrode portion 510 and the second auxiliary electrode portion 520 may not be provided.

An electrode portion of an optical switch according to embodiments of the inventive concept may control the optical path of light traveling a first optical waveguide or a second optical waveguide. Hereinafter, an operation of an optical switch according to embodiments of the inventive concept will be described.

Figure 14A:
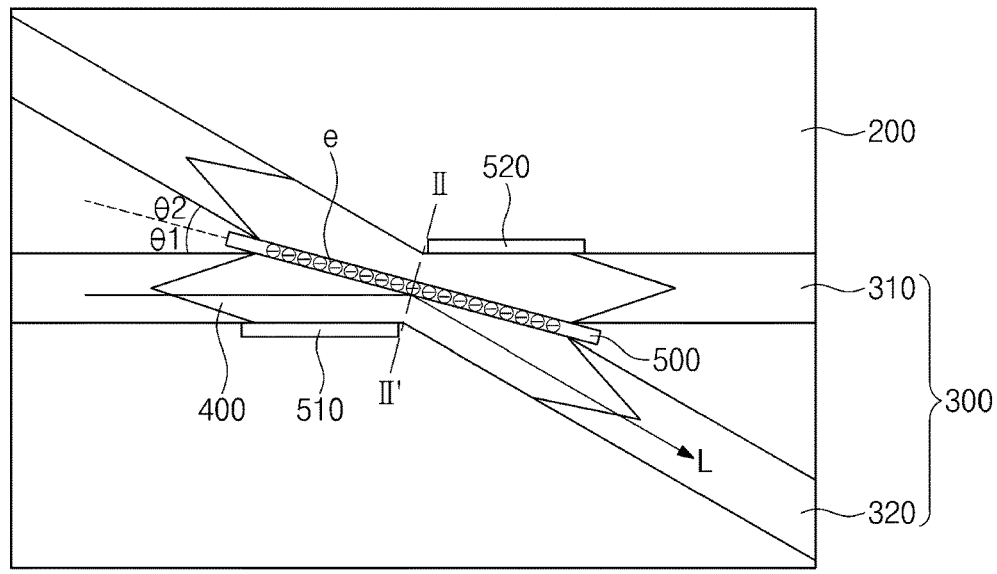
FIGS. 14A and 15A are plan views illustrating a switching operation of an optical switch according to embodiments of the inventive concept.
Figure 14A:
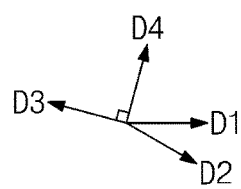
Figure 14B:
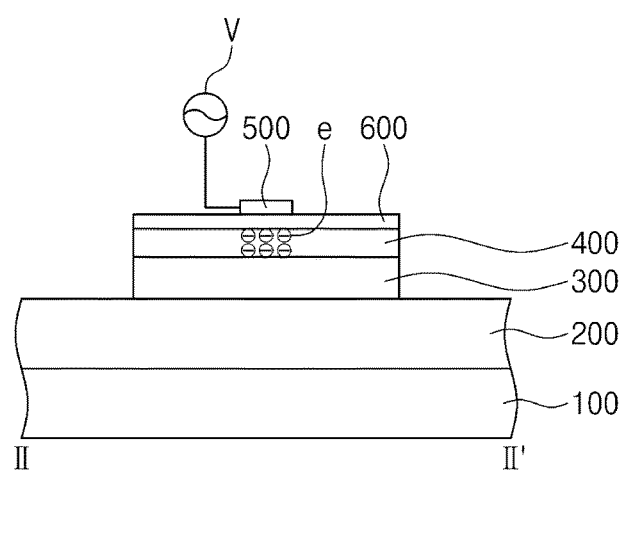
FIGS. 14B and 15B are sectional views taken along lines II-IF of FIGS. 14A to 15A.
Figure 15A:
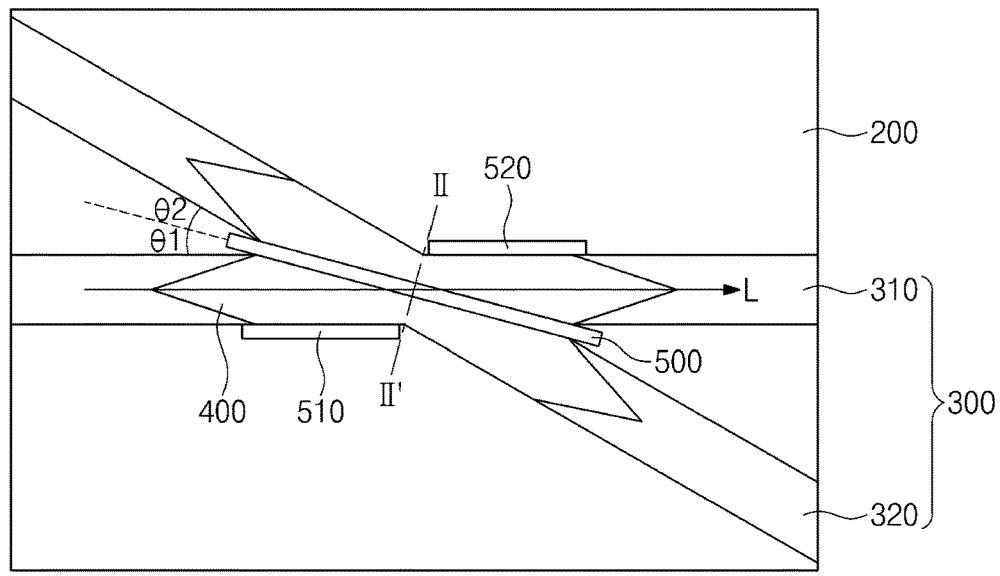
Figure 15A:
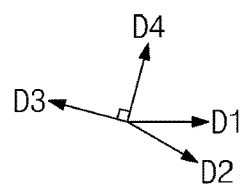

FIGS. 14A and 15A are plan views illustrating a switching operation of an optical switch according to embodiments of the inventive concept. FIGS. 14B to 15B are sectional views taken along lines II-IF of FIGS. 14A to 15A.

Referring to FIGS. 14A and 14B, the optical switch may switch the path of the light L traveling the first optical waveguide 310 or the second optical waveguide 320 in the first operation mode. For example, the electrode portion 500 may temporarily densify charges e to a portion of the conductive portion 400 adjacent to the electrode portion 500. In more detail, the external power supply V may be applied to the electrode portion 500. The charges e in the conductive portion 400 may be densely packed into a portion of the conductive portion 400 adjacent to the electrode portion 500 by the electrode portion 500. The densified charges e may totally reflect the light L traveling the first optical waveguide 310 to the second optical waveguide 320.

Figure 15B:
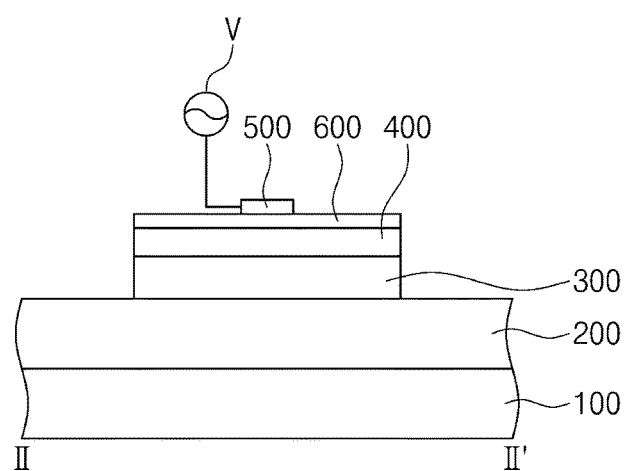

Referring to FIGS. 15A and 15B, the optical switch may maintain the path of the light L traveling the first optical waveguide 310 or the second optical waveguide 320 in the second operation mode. In detail, the external power supply V may be removed from the electrode portion 500. The charges e densified in the conductive portion 400 may be evenly distributed in the conductive portion 400. Accordingly, the light L traveling the first optical waveguide 310 may maintain the optical path.

Since an optical switch according to embodiments of the inventive concept performs an optical switching operation based on whether an external voltage is applied, the response speed of the optical switching operation may be very fast.

An optical switch according to embodiments of the inventive concept may not require a separate component for forming an optical switch. Accordingly, the size of an element including the optical switch may be reduced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An optical switch comprising:
   a substrate;
   a first optical waveguide disposed on the substrate and having a conductive portion disposed on one surface thereof; and
   a second optical waveguide disposed on the substrate and spaced apart from the first optical waveguide and having an electrode portion that is a doped portion of the waveguide,
   wherein the electrode portion and the conductive portion face each other, and the electrode portion controls an optical field between the first optical waveguide and the second optical waveguide, and
   wherein the second waveguide comprises a first side that faces the conductive portion and a second side opposite to the first side, and the second side adjacent to the electrode portion is undoped.

2. The optical switch of claim 1, wherein, in a first operation mode, the electrode portion densifies charges in a portion of the conductive portion adjacent to the second optical waveguide to block an optical field between the first optical waveguide and the second optical waveguide, and in a second operation mode, evenly distributes the charges densified in the conductive portion to optically couple the optical field between the first optical waveguide and the second waveguide.

3. The optical switch of claim 1, wherein the conductive portion and the first optical waveguide comprise the same material, and the conductive portion is doped with an impurity.

4. The optical switch of claim 3, wherein the first optical waveguide and the conductive portion are integrated.

5. The optical switch of claim 1, wherein the conductive portion comprises doped polysilicon or a transparent semiconductor.

6. The optical switch of claim 1, wherein the electrode portion and the second optical waveguide comprise the same material, and the electrode portion is doped with an impurity.

7. The optical switch of claim 1, further comprising a transparent insulation film disposed between the electrode portion and the conductive portion.

8. The optical switch of claim 1, further comprising a dielectric layer disposed between the first optical waveguide and the conductive portion or between the second optical waveguide and the electrode portion.

9. An optical switch comprising:
a substrate;
an optical waveguide disposed on the substrate and comprising a first optical waveguide and a second optical waveguide intersecting each other;
a conductive portion disposed on an intersection of the first optical waveguide and the second optical waveguide;
an electrode portion disposed on the conductive portion; and
a transparent insulation film disposed between the electrode portion and the conductive portion,
wherein the electrode portion crosses the intersection of the first optical waveguide and the second optical waveguide, and the electrode portion controls a path of light traveling the first optical waveguide and the second optical waveguide.

10. The optical switch of claim 9, wherein, in a first operation mode, the electrode portion densifies charges in a portion of the conductive portion adjacent to the electrode portion to totally reflect light traveling the first optical waveguide into the second optical waveguide, and in a second operation mode, evenly distributes the charges densified in the portion of the conductive portion in the conductive portion to transmit the light traveling the first optical waveguide.

11. The optical switch of claim 9, wherein a first angle between the electrode portion and the first optical waveguide is identical to a second angle between the electrode portion and the second optical waveguide.

12. The optical switch of claim 9, wherein the conductive portion comprises the same material as the optical waveguide and the conductive portion is doped with an impurity.

13. The optical switch of claim 12, wherein the conductive portion and the optical waveguide are integrated.

14. The optical switch of claim 9, wherein the conductive portion comprises doped polysilicon, a transparent semiconductor, or a transparent electrode.

15. The optical switch of claim 9, further comprising a first auxiliary electrode portion and a second auxiliary electrode portion on the conductive portion,
wherein the first auxiliary electrode portion and the second auxiliary electrode portion are disposed on both sides of the first optical waveguide adjacent to the intersection region of the first optical waveguide and the second optical waveguide.

16. The optical switch of claim 9, further comprising a third auxiliary electrode portion disposed on one side of a center portion of the electrode portion,
wherein the third auxiliary electrode portion is electrically connected to the conductive portion and the third auxiliary electrode portion is electrically insulated from the electrode portion.

17. The optical switch of claim 9, wherein the electrode portion comprises metal, the insulation film is an oxide, and the conductive portion comprises a semiconductor, such that the electrode portion, the insulation film and the conductive portion are a metal oxide semiconductor (MOS) structure.

* * * * *